Aug. 27, 1935.  W. L. MORRISON  2,012,541
PROTECTIVE DEVICE
Filed Sept. 21, 1932  3 Sheets-Sheet 1
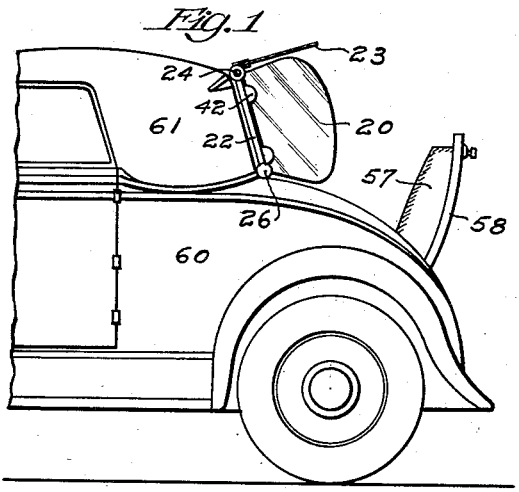
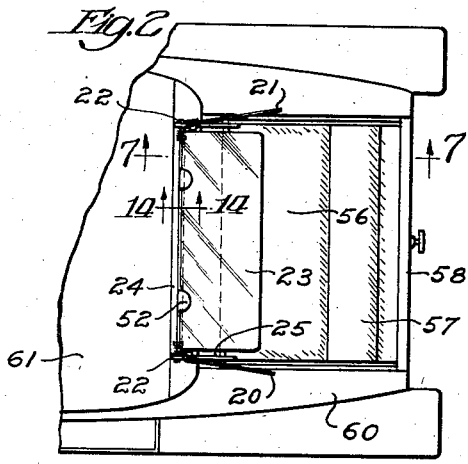
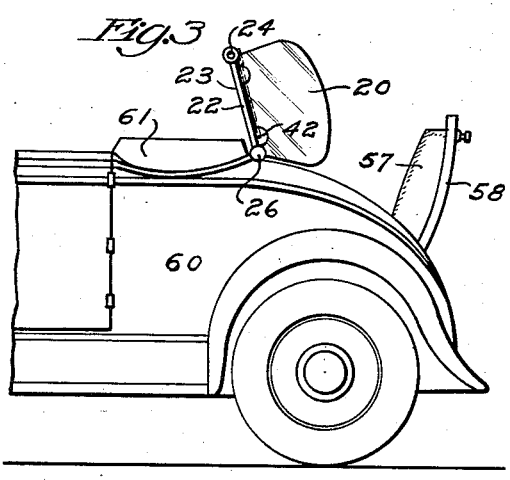
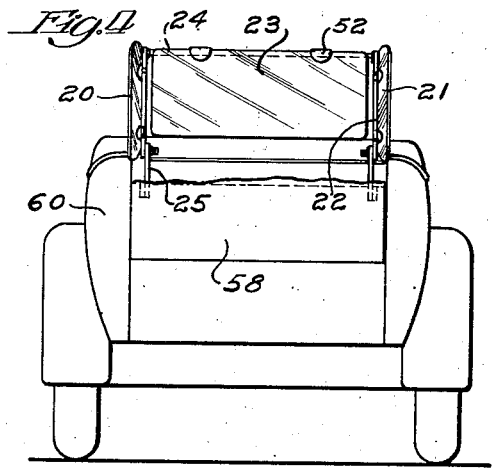
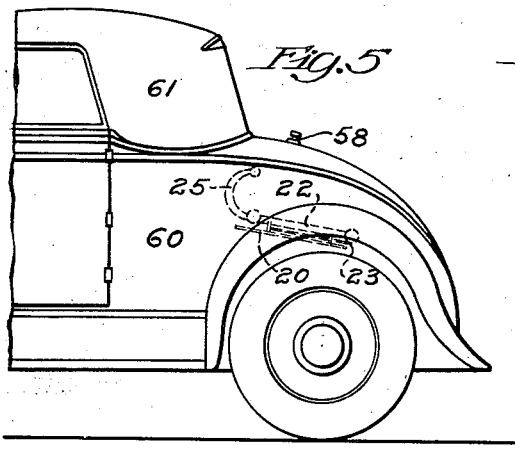
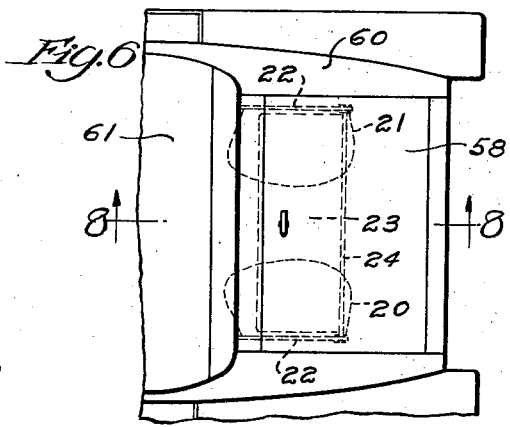
Inventor:
Willard L. Morrison
By Morsell, Lieber & Morsell
Atty Aug. 27, 1935. W. L. MORRISON 2,012,541
PROTECTIVE DEVICE
Filed Sept. 21, 1932   3 Sheets-Sheet 2
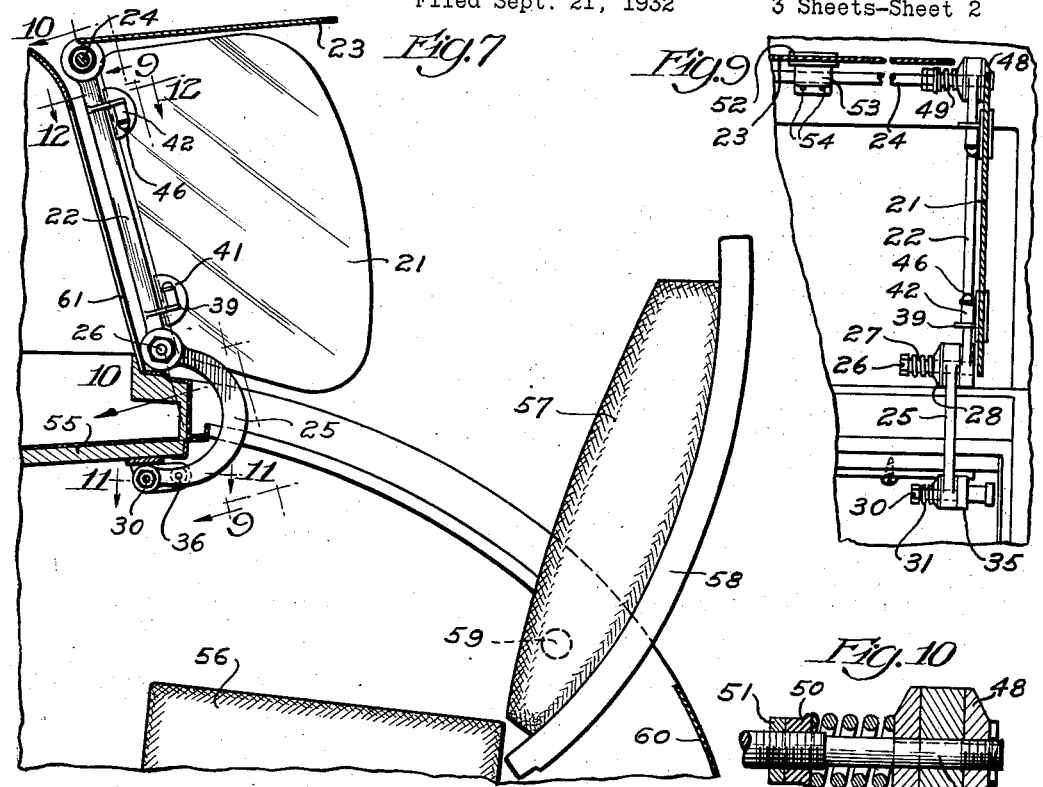
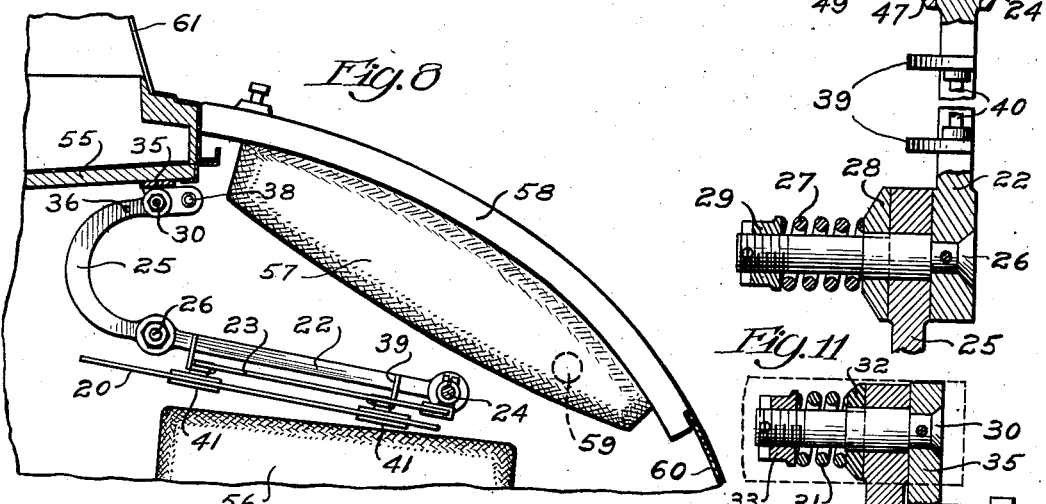
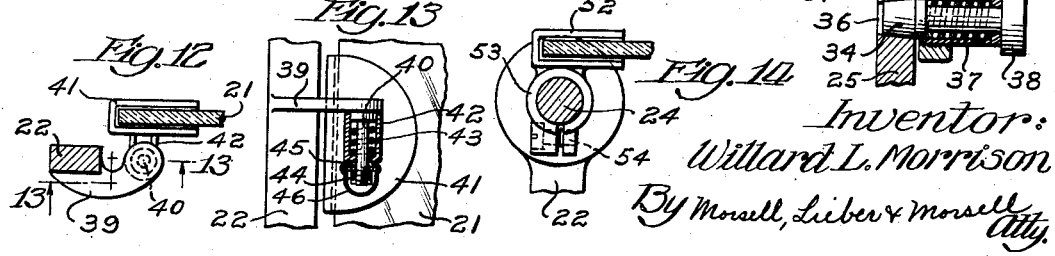
Inventor:
Willard L. Morrison
By Morsell, Lieber & Morsell
Atty.

Aug. 27, 1935.  W. L. MORRISON  2,012,541
PROTECTIVE DEVICE
Filed Sept. 21, 1932  3 Sheets-Sheet 3
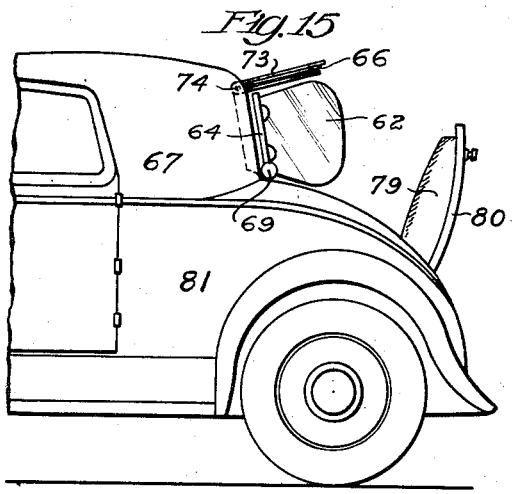
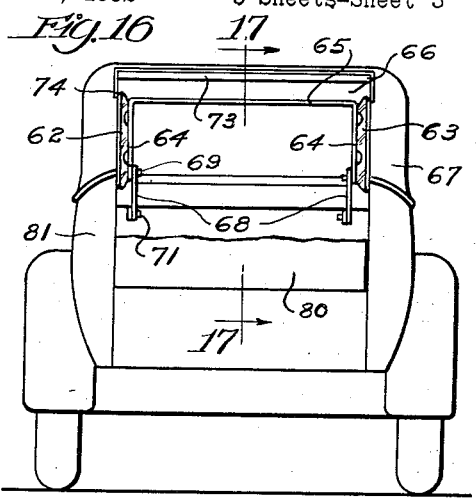
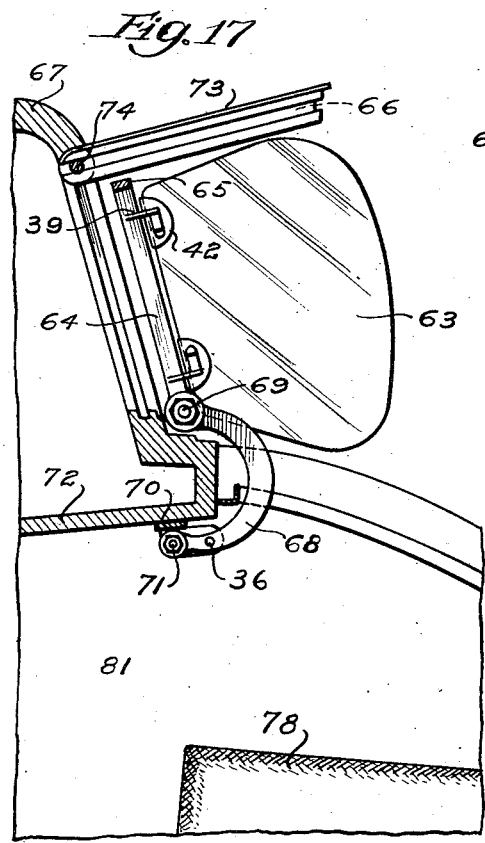
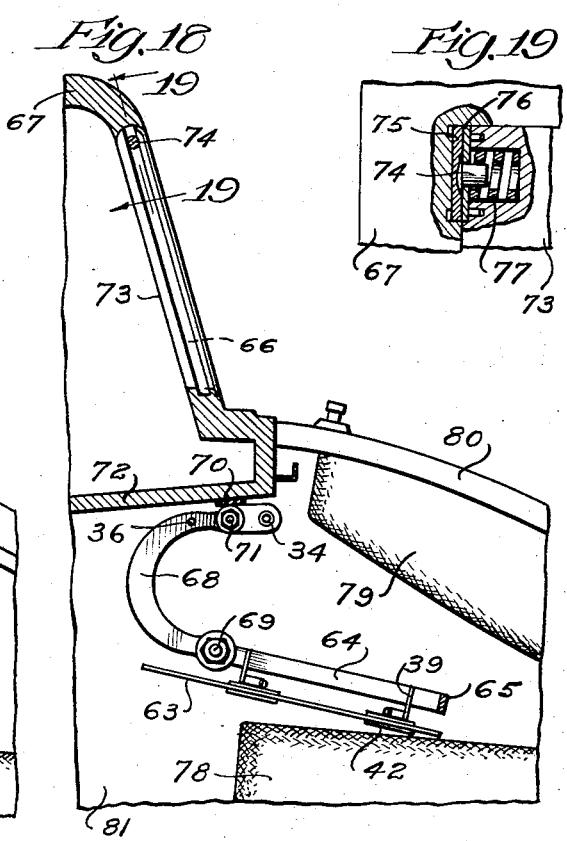
Inventor:
Willard L. Morrison
By Morsell, Lieber & Morsell
Atty.

Patented Aug. 27, 1935

2,012,541

UNITED STATES PATENT OFFICE 2,012,541

PROTECTIVE DEVICE

Willard L. Morrison, Lake Forest, Ill.

Application September 21, 1932, Serial No. 634,117

5 Claims. (Cl. 296—85)

The present invention relates in general to improvements in the construction of protective devices for the occupants of the rumble seat of a vehicle.

Many automobile models are provided with an emergency or rumble seat at the rear thereof, and since these seats are normally uncovered when in use, the occupants thereof are exposed to the wind and weather while the driver and other occupants of the front seat are protected. It is a well known fact that when a vehicle is advancing forwardly at high speed, there is a suction produced at the rear of the speeding car, and this suction causes drafts over the top and about the sides of the front enclosure, and frequently makes riding in a rumble seat extremely uncomfortable.

It is an object of the present invention to provide an improved protective device for the occupants of a vehicle rumble seat or the like, which will effectively eliminate annoying drafts and air currents, and which will also provide some shelter against rain and other precipitation.

Another object of the invention is to provide a rumble seat draft deflector which will afford substantially the same protection for the occupants, whether the front car enclosure is raised or lowered in the manner which is possible with convertible coupés.

A further object of the invention is to provide a compound wind deflector for rumble seats or the like, wherein a series of independently adjustable shields are utilized to protect the seat occupants from down drafts as well as from side air currents.

Still another object of the invention is to provide means for increasing the comfort of occupants of a rumble seat, by exposing them directly to the interior of the front enclosure of the vehicle.

Another object of the invention is to provide an improved protective device which is entirely concealed when the rumble seat with which it is associated, is closed, and which is moreover readily operable and highly flexible in use.

A further object of the invention is to provide an improved wind shield assembly which is simple and compact in construction, and which is moreover highly efficient in operation.

Still another object of the invention is to provide a wind deflecting device which may be manufactured and sold at minimum cost, and which may be readily installed in standard automobiles to produce a highly finished and attractive appearing accessory.

These and other objects and advantages of the invention will be apparent from the following detailed description.

A clear conception of several embodiments of the various features of the improvement, and of the mode of constructing and of operating protective devices built in accordance with the invention, will be had by referring to the drawings accompanying and forming a part of this specification, in which like reference characters designate the same or similar parts in the various views.

Fig. 1 is a side elevation of the rear portion of a convertible coupé, having the front enclosure raised and one of the improved protective devices in use;

Fig. 2 is a top view of the assemblage of elements shown in Fig. 1;

Fig. 3 is a side elevation of the rear portion of the same vehicle, with the front enclosure lowered and the protective device in use;

Fig. 4 is a rear view of the vehicle with the front enclosure lowered and the protective device in use;

Fig. 5 is a side elevation of the rear portion of the vehicle with the top enclosure raised and with the rumble seat closed;

Fig. 6 is a top view of the elements positioned as in Fig. 5;

Fig. 7 is an enlarged sectional fragment of the rear portion of the vehicle, with the parts positioned as in Fig. 1, the section being taken along the line 7—7 of Fig. 2;

Fig. 8 is a similarly enlarged sectional fragment of the rear vehicle portion, with the parts positioned as in Fig. 5, the section being taken along the line 8—8 of Fig. 6;

Fig. 9 is a likewise enlarged transverse section through the improved protective device of the preceding figures, the section being taken along the line 9—9 of Fig. 7;

Fig. 10 is a further enlarged section through a fragment of the improved protective device, taken along the line 10—10 of Fig. 7;

Fig. 11 is a similarly further enlarged section through the protective structure, taken along the line 11—11 of Fig. 7;

Fig. 12 is a likewise further enlarged section through the improved device, taken along the line 12—12 of Fig. 7;

Fig. 13 is a section through the portion of the improved device shown in Fig. 12, the section being taken along the line 13—13.

Fig. 14 is an enlarged section through the upper pivot of the protective device, taken along the line 14—14 of Fig. 2;

Fig. 15 is a side elevation of the rear portion of an ordinary coupé having a modified form of the improved protective device applied thereto and in use;

Fig. 16 is a rear view of the assemblage shown in Fig. 15 with modified protective device in use;

Fig. 17 is an enlarged section through a fragment of the vehicle and protective accessory of Fig. 15, taken along the line 17—17 of Fig. 16;

Fig. 18 is a similarly enlarged section through the modified form, taken longitudinally through the car body in advance of the protective device and showing the rumble seat in closed position; and Fig. 19 is a further enlarged sectional view through the top deflector hinge of the modified device, taken along the line 19—19 of Fig. 18.

In its broadest concept, the improved protective device consists generally of a pair of independently adjustable oppositely disposed side deflector shields or wings, and a top deflector adjustably mounted between and cooperating with the side wings, to shield the rumble seat occupants from drafts which tend to enter the rumble seat zone from the sides and top of the front of the vehicle.

Referring specifically to the embodiment of the invention shown in Figs. 1 to 14 inclusive, the protective device comprises in general independently adjustable transparent side wings 20, 21 pivotally mounted upon the opposite parallel side members 22 of a main swinging frame, and a top or intermediate transparent shield 23 pivotally mounted upon the horizontal cross-member 24 of the main frame between the wings 20, 21.

The corresponding inner ends of the frame side members 22 are swingably attached to the outer extremities of a pair of curved supporting arms 25, by means of coaxial pivot pins 26 shown in detail in Fig. 10, and are frictionally held in adjusted position by compression springs 27 coacting with friction washers 28 embracing the pins 26 and engaging the arms 25 and reacting against nuts 29 locked to the ends of the pins 26. The pivoted inner ends of the supporting arms 25 are mounted upon coaxial pivots 30 as shown in detail in Fig. 11, and are both frictionally held in various positions of angular adjustment, and positively locked when in operative position. The frictional holding of the arms 25 is effected by compression springs 31 coacting with friction washers 32 embracing the pivots 30 and engaging the arms 25, and reacting against nuts 33 locked to the ends of the pivots 30. The positive locking is afforded by spring pressed latches 34 slidably mounted in the arm supporting brackets 35 and engageable with openings 36 formed in the arms 25, the latches 34 being withdrawable from the openings 36 against the pressure of the springs 37 by means of actuating heads 38, and the latch points serving to positively engage the openings 36 and to hold the frame up when the arms 25 are swung upwardly to the extreme extent.

The side arms 22 of the main frame, are also provided with lugs 39 having pivot pins 40 secured thereto, and the wings 20, 21 are provided with supporting cleats 41 having integral tubular extensions 42 embracing the pins 40 of the lugs 39, as shown in Figs. 12 and 13. The pins 40 are embraced by springs 43 which react against the adjacent lugs 39 and the ends of the tubular extensions 42, and the free ends of the pins 40 project outwardly beyond the extension 42 and are provided with clamping nuts 44 and with friction washers 45 for clamping the extensions 42 against the lugs 39. The nuts 44 and washers 45 may normally be concealed by ornamental caps 46, and the wings 20, 21 may be angularly independently adjusted about their supporting pivot pins 40 at any time, being frictionally retained in adjusted position.

The outer extremities of the side arms 25 of the main frame, have the opposite ends of the cross-member 24 frictionally adjustably attached thereto by means of clamping washers 47, 48, springs 49 coacting with the washers 47, and nuts 50, 51, coacting with the member 24 and with the springs 49. The top or intermediate shield 23 is provided with rigid cleats 52 shown in Fig. 14, having integral clamping portions 53 embracing the pivot member 24 and adapted to be forced into intimate engagement therewith by clamping screws 54. The rod-like member 24 is therefore normally movable with the shield 23 which may be swung into any desired position relative to the side members 22, and is frictionally retained in adjusted position by the springs 49. The lock nuts 51 and spring tensioning nuts 50 serve to regulate the frictional holding effect.

The improved protective unit just described in detail, may be applied to a car as an accessory, as shown in Figs. 7 and 8, by attaching the supporting brackets 35 firmly to the seat board 55, in front of the rumble seat 56. The back 57 of the rumble seat 56 is carried by the rear closure or cover 58 supported through pivots 59 from the car body 60, in a well known manner. The front top or closure 61 which houses the driver's seat, is collapsible or removable as shown in Figs. 3 and 4, and the cover 58 is freely swingable from the position illustrated in Figs. 1 and 3 to that of Fig. 5, and vice versa.

When the protective device of Figs. 7 to 14 inclusive has been properly applied to an automobile of the type illustrated in Figs. 1 to 6 inclusive, it may be utilized to advantage both when the top enclosure 61 is up, as shown in Figs. 1 and 2, or down, as shown in Figs. 3 and 4. Assuming the top enclosure 61 to be up as shown in Figs. 1 and 2, the rumble seat cover 58 may then be raised or lowered at will. The frame comprising the members 22, 24 may be swung upwardly against the rear of the top enclosure 61 as indicated in Fig. 1, the curved arms 25 permitting forward swinging of the frame to this extent. When the frame has been thus positioned, the locking latches 34 may be brought into engagement with the openings 36 of the arms 25, whereupon the frame will be positively positioned. The wings 20, 21 and the top shield 23 may then be adjusted to any desired position so as to eliminate annoying drafts in the zone of the rumble seat 56. In addition to eliminating undesirable drafts, the wings 20 and shield 23 will also protect the occupants of the rumble seat, from rain and precipitation, thus making it a comfort to ride in the rumble seat.

If the top enclosure 61 has been lowered as illustrated in Figs. 3 and 4, the shield 23 may obviously be utilized as a windshield so as to protect the occupants of the rumble seat 56 from direct drafts to which they would be subjected if no windshield were provided. The side wings 20, 21 may be utilized to deflect the side drafts, thus again assuring comfort for the occupants of the rumble seat.

If it is desired to close the rumble seat, the protective device may be swung into the position illustrated in Figs. 5 and 6. The weight of the device will then be supported by the rumble seat 56 and closing of the cover 58 is entirely unobstructed. Such positioning of the protective device is made possible by the pivotal connection between the side members 22 and the curved arms 25, and the device is obviously thoroughly concealed and protected when the cover 58 has been closed.

Referring specifically to the modified embodiment of the invention illustrated in Figs. 15 to 19 inclusive, the side wings 62, 63 are pivotally attached to the side members 64 of a one piece frame 65, but the intermediate shield 66 comprises the rear window of the top enclosure 67 of the vehicle, and is not attached directly to the frame 65.

The inner free ends of the side members 64 are adjustably pivotally attached to the swing ends of curved side arms 68, by means of pivot pins 69 similar in construction and assembly to the pins 26 of Fig. 10, and the opposite ends of the arms 68 are pivotally attached to brackets 70 by means of pivots 71 similar to the pivots 30 of Fig. 11. The brackets 70 are attached to the bottom 72 of the front seat and the arms 68 have openings 36 cooperable with latches 34 in the manner previously described, in order to lock the arms 68 in uppermost position as in Fig. 17. The side members 64 of the frame 65 are also provided with integral lugs 42 and the wings 62, 63 are pivotally and adjustably associated with these lugs in the same manner as previously described.

The transparent intermediate shield 66 is carried by a frame 73 which is pivotally attached at its upper end to the vehicle top enclosure 67, by means of substantially horizontal pivots 74. These pivots 74 may be constructed as shown in Fig. 19, with the pivots rigidly attached to the enclosure 67 by friction plates 75, and the frame 73 provided with sliding plates 76 frictionally engageable with the fixed plates 75 and urged thereagainst by springs 77 embracing the pivots 74. The rumble seat 78 is disposed behind and beneath the shield 66, and the back 79 of the seat 78 is carried by the closure cover 80 which is mounted in the same manner as the cover 58 previously described, so as to conceal the seat 78 and back 79 within the vehicle body 81.

When utilizing the modified protective device illustrated in Figs. 15 to 19, the positioning and use of the side shields 62, 63 is the same as described in connection with Figs. 1 to 6 inclusive. Before raising the frame 65 to operative position, the frame 73 should first be swung upwardly as indicated in Figs. 15 and 17, whereupon the frame 65 may be swung beneath the frame 73 and will serve to retain the latter in elevated position. The friction afforded by the springs 77 will, however, relieve the cross-member of the frame 65 from undesirable pressure. When the shield 66 and the frame 65 have been properly positioned, the wings 62, 63 may be adjusted to any desired position so as to eliminate undesirable side drafts in the zone of the rumble seat 78. The shield 66 will at the same time prevent undesirable down drafts at the rumble seat, thus again insuring comfort for the occupants of the rumble seat 78.

When the modified protective device is not in use, the side wings 62, 63 and the frame 65 may be positioned as shown in Fig. 18, resting upon the rumble seat 78, and the frame 73 may be swung to closed position thereby causing the shield 66 to serve as an ordinary rear window. Upon concealment of the protective device within the car body 81, this device is thoroughly protected against damage, and no part thereof remains visible.

From the foregoing description, it will be apparent that the present improvement provides a rumble seat draft eliminator which is simple and compact in construction and which is moreover highly efficient and flexible in operation. The improvement may be conveniently applied to any standard make of car having a rumble seat associated therewith, and with the embodiment of the invention illustrated in Figs. 15 to 19 inclusive, the occupants of the rumble seat 78 will also receive heat from within the top enclosure 67. The improved device may obviously be manufactured at minimum cost and quickly installed, and does not mar the appearance of a car to which it is applied.

It should be understood that it is not desired to limit the invention to the exact details of construction and to the precise mode of operation of devices herein shown and described, for various modifications within the scope of the claims may occur to persons skilled in the art.

It is claimed and desired to secure by Letters Patent:

1. A protective assemblage for the occupants of an open vehicle seat, comprising, a pair of laterally spaced side wings swingable independently of each other about upwardly extending pivots disposed forwardly of the seat to control the side draft at the seat, and a top shield swingable from substantially horizontal position into the space between said wings about a horizontal pivot disposed at the forward edge of the shield and near the upper forward ends of the wings for controlling the medial draft at the seat, said wings and said shield being simultaneously swingable toward the seat about a horizontal pivot disposed near the lower ends of said wings.

2. A protective assemblage for the occupants of an open vehicle seat, comprising, a frame consisting of interconnected laterally spaced side members disposable forwardly of the seat, a side wing swingably supported by each of said side members to control the side draft at the seat, said frame being movable to simultaneously move said wings out of operative position, and a top shield swingable from substantially horizontal position into substantially vertical position within the space between said side members about a horizontal pivot disposed at the forward edge of the shield and near the upper ends of the side members when the frame is in operative position for controlling the medial draft at the seat.

3. A protective assemblage for the occupants of an open vehicle seat, comprising, a frame consisting of interconnected laterally spaced side members disposable forwardly of the seat, a side wing swingably supported by each of said side members to control the side draft at the seat, and a top shield carried by said frame and swingable from substantially horizontal position into substantially vertical position within the space between said side members about a horizontal axis disposed at the forward edge of the shield and near the upper ends of the side members when the frame is in operative position for controlling the medial draft at the seat, said wings and said shield being simultaneously swingable toward and away from the seat by movement of the frame about its pivotal axis.

4. A protective assemblage for the occupants of an open vehicle seat, comprising, a frame consisting of side members and a cross-member connecting said side members, pivoted supporting arms pivotally attached to the opposite corresponding ends of said side members, a side wing swingably supported by each of said side members, and a top shield pivotally supported by said cross-member for swinging movement from substantially horizontal position to substantially vertical position within the space between said side members, said frame being angularly adjustable with respect to said arms and said arms being swingable with respect to a fixed support.

5. A protective assemblage for the occupants of an open vehicle seat, comprising, a frame consisting of side members and a cross-member connecting the outer swinging extremities of said side members, pivoted supporting arms pivotally attached to the inner corresponding ends of said side members, a side wing swingable about each of said side members as a pivot, and a top shield pivotally supported for swinging movement from substantially horizontal position to substantially vertical position within the space between said side members and said wings, said frame being angularly adjustable with respect to the swinging ends of said arms and the opposite ends of said arms being swingable with respect to a fixed support.

WILLARD L. MORRISON.